United States Patent [19]
Lovitt

[11] Patent Number: 5,649,490
[45] Date of Patent: Jul. 22, 1997

[54] APPARATUS FOR SUPPORTING AND RAISING AUXILIARY RAIL WHEELS ON A VEHICLE

[76] Inventor: Estel L. Lovitt, 5102 Brendon Way, Sylvania, Ohio 43560

[21] Appl. No.: 306,694

[22] Filed: Sep. 16, 1994

[51] Int. Cl.$^6$ .................................................. B61F 9/00
[52] U.S. Cl. ............................ 105/72.2; 104/7.1; 104/9
[58] Field of Search .......................... 105/72.2, 215.2, 105/26.1; 104/9, 6, 7.1, 7.2

[56] References Cited

U.S. PATENT DOCUMENTS

| | | | |
|---|---|---|---|
| 3,020,858 | 2/1962 | Perkins et al. | 105/72.2 |
| 3,338,184 | 8/1967 | Fisher | 105/215.2 |
| 4,520,735 | 6/1985 | Field | 105/215.2 |
| 5,156,639 | 10/1992 | Bostrom | 105/72.2 |

*Primary Examiner*—Mark T. Le

[57] ABSTRACT

The subject invention is an improved apparatus structured and adapted to support rail wheels on an over-the-road vehicle that is adapted accordingly to ride over railroad rails as well as over the ground on roadways, such apparatus being adapted to support as well as raise or lower the railroad wheels as needed for such purpose, and with a basic structure comprising one or more vertically disposed support members affixed to the main frame of the vehicle, there being affixed to each such vertically disposed support members affixed to the main frame of the vehicle, a reciprocally movable lifting arm, each such support member having a rail wheel affixed to the lower end of each such lifting arm, with the lowest movable extent of such lifting arm adapted to position the affixed rail wheel to the rail level, with the extreme upper vertical movement of such lifting arm being positioned away from the rail in the retracted position so that the vehicle can travel over the road or ground without impediment from the rail wheel. Alternately stated, affixed to the under-frame of the vehicle are retractable, longitudinally and vertically extending members that have affixed to their lower ends rail wheel members, such that the rail wheels can be raised and lowered in a direct vertical movement from the rail level to the retracted upward position, with the added feature of retractable ground support members being integrally positioned on the fixed portion of such verticle support member.

4 Claims, 6 Drawing Sheets

APPARATUS FOR SUPPORTING AND RAISING AUXILIARY RAIL WHEELS ON A VEHICLE

DESCRIPTION OF PRIOR ART AND BACKGROUND OF THE INVENTION

The invention herein is directed to over-the-road vehicles that are utilized for various functional purposes, such as mobile cranes, backhoes, bulldozers, and other similar functional vehicles, particularly vehicles that are primarily self-propelled land vehicles which can alternately be moved over railroads tracks as needed, as well as the ground or roadways. Usually, but not always, such vehicles are generally designed and structured for a particular work function that can be completed while being positioned or moved along railroad tracks, as well as on the ground. Moreover, such vehicles can usually be moved or transported from place to place in order to perform such work function either on the rails or on the ground. Thus, each such vehicle is constructed so that it can be moved to its particular work location and for this purpose, is generally, but not always, powered by a self-contained engine.

In the railroad context, such mobile work vehicles are often required to perform construction repair or even inspection functions on or near a railroad bed. For example, cranes, backhoes, and similar such vehicles are used in such activities as rail laying, rail bed maintenance, railroad tie removal and installation, and other similar railroad construction activities. Other such vehicles may be used only for inspection or transportation over the rails in addition to having over-the-ground capabilities. Such vehicles, as can be surmised, must be equipped with both rail wheels and over-the-ground wheels that must be road use to rail use and reciprocally back to road use as needed.

In present railroad technologies, these land-based vehicles have the capacity to ride over land as well as on railroad tracks. They are generally equipped with auxiliary rail wheels in addition to ground wheels that can be lowered or somehow placed in position so that the rail wheels engage the rail wheels engage the rails and permit the vehicle to be transported over the railroad tracks. In this latter deployment, the land-based wheels are frequently positioned and used to engage on their peripheral, circumferential surface the upper rail surface, while the juxtaposed rail wheels engage the rail in the usual flanged engagement in order to keep the vehicle on the railroad tracks. In this latter relationship when the rail wheels are deployed downwardly in engagement with the rails, the ground wheels frictionally engage the upper rail surfaces to propel the vehicle over the railroad tracks.

There are significant problems encountered with the deployment and structuring of rail wheels on such vehicles. One of the problems seen in this structuring and deployment is that the retractable rail wheels are generally affixed to the frame of the vehicle in a manner that does not permit efficient retraction or lowering of the wheels, as necessary. Part of the reason for the latter aspect is that rail beds are usually laid and constructed through areas where there is no road access over which such landdriven, rubber-wheel based vehicles can be driven and thence moved off the rails in such remote areas. Accordingly, a need exists for some structural assembly to make it easier to move the work vehicle on and off the tracks in a given work location, with accompanying features that provide an efficient mechanism for quickly and effectively lowering the rail wheels in place, and lowering the outrigger styled ground support members through a single unit. In such situations where the work vehicle is employed in certain, specific work function, it is necessary to have rail clampling means as an additional feature. In such circumstances wherein a singular unit can be structured on a work vehicle, include the rail wheels, rail lowering means, auxiliary ground support means, and rail clamping means a more efficient work operation can evolve with this resultant work efficiency.

Yet another problem with existing mechanisms that raise and lower vehicles is that most are not sufficiently stable or constructed for maximum strength and stability for the holding of such rail wheels in both the lowered and raised positions. The subject invention is conceived to overcome these problems and provide a land-based vehicle for railroad work which has a simplistic auxiliary rail support apparatus to raise and lower the rail wheels with means to bias the rail wheels in place, and the following objects of the subject invention are addressed accordingly.

OBJECTS

In view of the foregoing, following are the objects of the subject invention:

It is an object of the subject invention to provide an improved auxiliary rail apparatus for work vehicles that are land-based vehicles;

It is a further object of the subject invention to provide an improved auxiliary system of structuring rail wheels for vehicles used on rails as well as over the land;

A further object of the subject invention is to provide an improved construction for work vehicles that are deployed on both rails or on the ground;

Yet another object of the subject invention is to provide an improved rail wheel and lowering system for land-based vehicles that is adapted to drive over roads, land, or railways;

Another object of the subject invention is to provide an improved system for lowering rail wheels for working vehicles that can be moved over land or railroad tracks;

It is an object of the subject invention to provide an improved auxiliary rail system for land-based vehicles which are used for railroad construction work;

It is a further object of the subject invention to provide an improved structure for an auxiliary system of rail wheels that are used on railroads as well as over the land;

A further object of the subject invention is to provide an improved construction for work vehicles that are deployed on rails or on the ground or on roadways;

Yet another object of the subject invention is to provide an improved vehicle rail lowering system for land-based vehicles which is adapted to drive over roads, land, or railroads;

Still another object of the subject invention is to provide an improved system for lowering and raising rail wheels for working vehicles that can be moved over land or rails;

Yet another object of the subject invention is to provide an improved auxiliary rail apparatus for a land-based motor vehicle that is adapted to ride over the ground, or alternately, on separate rail wheels over railroads rails;

Other and further objects of the subject invention will become apparent from a reading of the following description in connection with the drawings.

DRAWINGS

DESCRIPTION OF GENERAL EMBODIMENT

The subject invention is an improved apparatus structured and adapted to support rail wheels on an over-the-road vehicle that is adapted accordingly to ride over railroad rails as well as over the ground on roadways, such apparatus being adapted to support as well as raise or lower the railroad wheels as needed for such purpose, and with a basic structure comprising one or more vertically disposed support members affixed to the main frame of the vehicle, there being affixed to each such vertically disposed support members affixed to the main frame of the vehicle, there being affixed to each such vertically disposed support member a reciprocally movable lifting arm, each such support member having a rail wheel affixed to the lower end of each such lifting arm, with the lowest movable extent of such lifting arm adapted to position the affixed rail wheel to the rail level, with the extreme upper vertical movement of such lifting arm being positioned away from the rail in the retracted position so that the vehicle can travel over the road or ground without impediment from the rail wheel. Alternately stated, affixed to the under-frame of the vehicle are retractable, longitudinally and vertically extending members that have affixed to their lower ends rail wheel members, such that the rail wheels can be raised and lowered in a direct vertical movement from the rail level to the retracted upward position.

DESCRIPTION OF PREFERRED EMBODIMENT

In describing the subject invention, it must be stressed that the subject invention is only of one preferred embodiment and that the scope of the claims appended hereto are not to be limited by the following description. Therefore, the following description exemplifies only one preferred embodiment of the subject invention.

Figure 1:
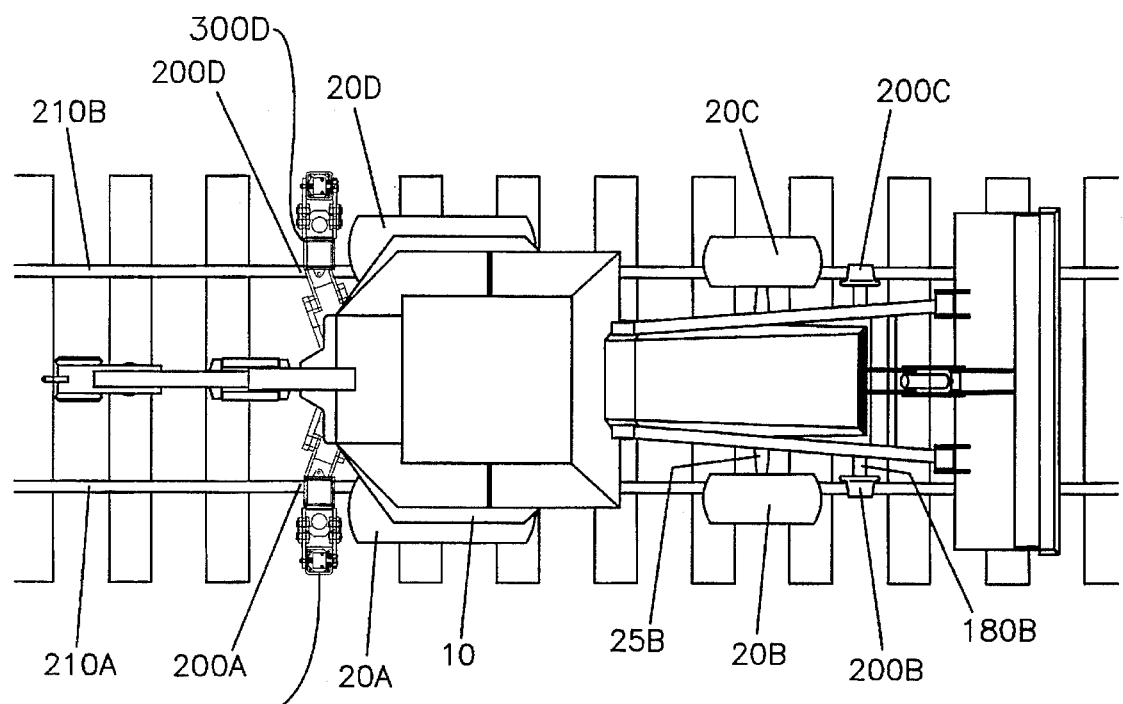
FIG. 1 is a side elevational view of a railroad construction vehicle with subject apparatus shown.
Figure 2:
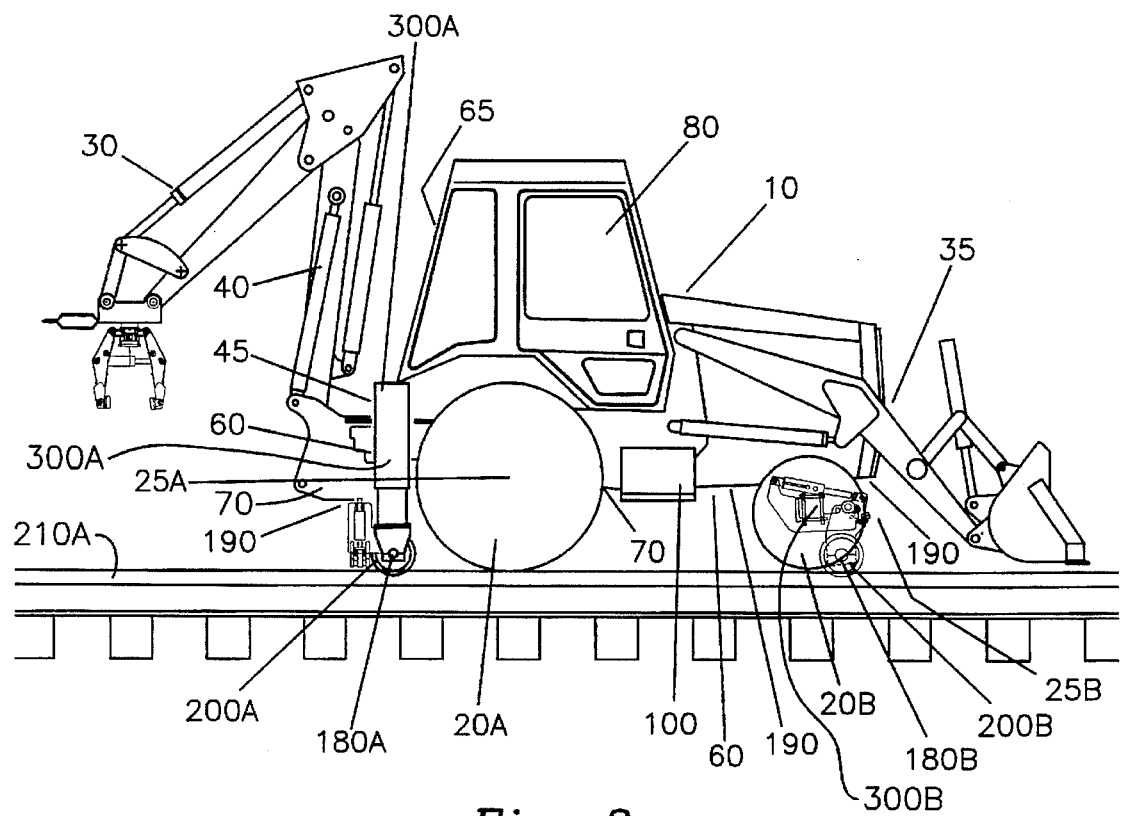
FIG. 2 is a front end elevational view of the vehicle shown in FIG. 1, showing a side elevational view of the subject apparatus.

Referring now to the drawings and particularly to FIGS. 1 and 2, a land-based vehicle 10 is shown, such land-based vehicle 10 is constructed and adapted as a land-based, self-propelled vehicle which is adapted to be primarily propelled on land-based wheels 20A, 20B, 20C, and 20D. Such land-based wheels are affixed on front ground wheel axle 25A and rear ground wheel axle 25B. The exact number of land-based wheels vary for the type of vehicle used. Moreover, the vehicle 10 is adapted to ride on rail wheels as described below. As can be seen in the drawings, the land-based vehicle 10 supports a work implement such as a lift unit 30 structured on the end of a boom 40. It is to be indicated that the invention herein is equally applicable to any type of work vehicle, and not just one which supports a lift. Thus, vehicle 10 may be adapted to support any type of work implement both on the front and back of vehicle 10, as shown, or simply may be any vehicle that is adapted to ride over rails and on the ground even of no implement is attached.

Thus, the demonstration of a lift apparatus in this description of a preferred embodiment is exemplary only for purposes of fully describing the subject invention. As seen, boom 40 is mounted on part of the vehicle superstructure 45 of the vehicle 10. A horizontal platform 60 serves as the base for the super-structure 45 on which the boom 40 is indirectly mounted. The platform 60 is, in turn, integrally affixed to a portion of the vehicle frame 70. Mounted on the upper surface of the platform member 45 and comprising one of the main elements on the superstructure 50 is the operator's cab 80, within which the operator is located during operations. As seen in the drawings, the cab 80 is mounted on the upper medial surface portions of platform member 60, as shown. Affixed to the frame 70 of the vehicle 10 is a drive power unit 100. A portion of the drive train elements, as shown schematically in FIG. 1, comprises the drive power unit connected through two separate differential units, not shown, and each such differential unit is thence respectively connected to main drive axle members 25A and 25B. Thus each set of land-based drive wheels 20A, 20B, and 20C are direct power-driven members being driven through axle 25A and 25B members respectively. Thus, the drive axles 25A and 25B are adapted to transmit rotational drive to the land-based drive wheels 20A, 20B, 20C, and 20D as the main driving elements. Additional differential units may be provided for the rail wheels described below, although this is optional.

As stated above, the structural arrangement for the vehicle 10 described above is generally that of a land-based vehicle which is adapted to be used and driven as a land-based, self-propelled work vehicle to be used for specialized or non-specialized functions, that may be adapted or retro-fitted for land-based or rail-based functions. No inventive concept is claimed as to the foregoing vehicular structure. The subject invention is centered on structural and constructional arrangement whereby the vehicle 10 is originally fitted or retro-fitted with appropriate structural mechanisms to provide the vehicle with the additional capacity for being driven and used over railroad tracks as well as over the ground. Specifically, the vehicle 10 has integrally affixed to the undersurface portion of the frame 70 of the vehicle 10 two additional longitudinally extending stub axle members 180A and 180B, referred herein to as frontal rail wheel axle member 180B and posterior rail wheel axle member 180A respectively, with frontal axle 180B being rotatably mounted on the front portion of the undersurface portion 190 of frame 70, as shown, while rear axle member 180A as mounted on the rear portion of the undersurface portion 190 of frame 70, as shown. More specifically, frontal rail wheel axle 180B is mounted in parallel fashion in front of main drive axle 25B and posterior rail drive wheel axle 25A is mounted in parallel fashion just aft of the axle member 25A, as can be seen from the drawings. This particular arrangement and position of the rail wheel axle members 180A and 180B is not critical to the subject invention, as they may be located in any position under the frame 70 and still fall within the scope of the subject invention. Moreover, as stated, these rail axle members may, as described below, be stub axle members or mounted independently of the frame 70. There is not inventive concept in the above-described deployment of auxiliary rail wheels on a land-based vehicle as stated.

As can be determined in the drawings, both the frontal rail wheel axle 180B and the posterior rail wheel axle 180A have rail wheels affixed on their respective outer ends that are retractable so as to be lowered or raised into the retractable position. These rail wheels 200A, 200B, 200C, and 200D are not power driven members and are freely rotatable for free rotation along railroad tracks 210A and 210B, when the wheels are in the engagement position. This latter arrangement is a conventionally structural disposition for a land-based vehicle that is adapted to ride on the rails as well as the ground. These latter described features are of a conventional nature for such a vehicle as vehicle 10.

A further conventional arrangement for such land-based vehicles that have ground or railroad capabilities is structural characteristics that comprise structural elements to raise and lower the rail wheels from the downwardly extended position to an upwardly retracted position. The downwardly extended position is that position in which the rail wheels are positioned to ride on railroad rails 210A and 210B, usually with the ground wheels 20A, 20B, 20C, and 20D being positioned to ride on their outer circumferential peripheries on top of such rails 210A and 210B, with such ground wheels providing the traction power over the top rail surfaces, with the rail wheels 200A, 200B, 200C, and 200D, as stated being free-rolling members functioning primarily to hold the vehicle 10 on rails 210A and 210B with their respective flanged extremities. Again these latter described features are not novel within the relevant art area.

As stated above, there are two basic arrangements for deploying the rail wheels 200A, 200B, 200C, and 200D on the vehicle 10. In the most common arrangement, the rail wheels 200A, 200B, 200C, and 200D are affixed to frontal and rear rail axle members 180B and 180A respectively, such that rail wheels 200C and 200B are affixed to the front rail axle 180B, while rail wheels 200A and 200D are affixed to the rear wheel axle 180A. In this latter arrangement, the rail wheels can be powered through a separate differential, as needed, or alternately, can be free wheeling, rotatable members dependent for motive power being imparted through the ground wheels, 20A, 20B, 20C, and 20D tractionally engaging the upper surfaces of the rails 210A and 210B, as previously described. In another structural arrangement, the rail wheels 200A, 200B, 200C, and 200D may be deployed without being affixed to longitudinial axle members, and in such latter circumstances, the rail wheels are affixed to individually retractable members that raise and lower the rail wheels as individualized units, basically independently of one another, but preferably in unison so that the rail wheels 200A, 200B, 200C, and 200D are raised or lowered simultaneously into position on the railroad rails 210A and 210B. The subject invention is adapted to either structural arrangement, irrespective of whether the rail wheels are affixed to longitudinally extending, rotatable axle members or affixed to individualized supporting and retractable members. Both structured arrangements are discussed below relative to application of features of the subject invention.

First, described below will be that embodiment in which the rail wheel members 200A, 200B, 200C, and 200D are affixed to individualized supporting and retractable members for each such rail wheel. Thereafter will be described alternate embodiments thereof.

Thus, referring now to FIGS. 3, 4, 5, 6 and 7 of the drawings, in one embodiment of the subject invention, integrally affixed to the frame 70 of the vehicle 10 are vertically and longitudinally extending wheel support members. In this embodiment, the vertical rail wheel support members may be provided and affixed to opposing portions of the frame 70 of vehicle 10 just forward of the area where the front ground wheel axle 25A is disposed. At the rear of the vehicle 10, vertical rail wheel support members 300A and 300D is affixed on opposing sides of the frame 70 of the vehicle 10 and, at a position immediately posterior to the area where rear ground wheel axle 20a is positioned and affixed to the frame 70 of vehicle 10. It is to be noted, however, that the precise positioning of the vertical rail wheel support members may vary from those positions just indicated and thusly the forward rail wheel support members may be affixed to the vehicle frame 70 of vehicle 10 at a position either in front of or posterior to the front ground wheel 20B. In similar fashion, the posterior rail wheel support members 300A and 300D may be affixed at a portion of the vehicle frame 70 other than just posterior to the rear road ground wheel axle 25A and may be optimally affixed anterior to the rear ground wheel axle 25A. Moreover, the front rail wheel support member 300B may be affixed to a portion of the vehicle other than the support frame 70 of vehicle 10. However, in the preferred embodiment of the subject invention, it is considered to be feasible to have these vertical rail support members affixed to some part of the frame 70 of vehicle 10 and preferably at a position so that the rail wheels 200A, 200B, 200C, and 200D affixed will extend directly over the rails 210A and 210B in close proximity to the respective adjacent ground wheels 20A, 20B, 20C, and 20D.

As can be seen in the drawings, the rail wheel support member is vertically disposed in its respectively affixed position on the frame 70 of vehicle 10, however, it is not critical to implementation of the subject invention that these rail wheel support members be aligned exactly or precisely in a vertical position so long as each is capable of projecting its respectively appended rail wheel downwardly to the appropriate position of engagement with the appropriate adjacent rail 210A or 210B.

In general, each rail wheel support member is multifaceted, as discussed herein, with each individualized rail wheel support member being structured and equipped with rail lowering and rail wheel biasing means, auxiliary, outrigger-type, ground support means to help stabilize the vehicle 10 during certain work function, and optionally rail clasping means used in circumstances such as whenever ties are being removed from the railbed.

In describing the precise structural aspects of each rail wheel support member, attention is directed only to rail wheel support member 300A, as each vertical rail wheel support member will be similarly constructed and operated to rail wheel member 300A. Specifically, rail wheel support member 300A is a longitudinally extending, substantially vertical member having a longitudinal extending central axis, referred as the long axis, with the rail wheel support member having an upper end 410a and a lower end 420a at the respective ends of such longitudinal central axis. In the general as well as the preferred embodiment, the upper end 410a is the upper end of the rail wheel support member, 300A that will be generally affixed to and append from the frame 70 of vehicle 10 although it can be attached otherwise in the vehicle 10.

Thus, in the embodiment shown in the drawings, the rail wheel support member 300A is affixed at or near its upper end 410 on a portion of the longitudinally extending frame 70 of vehicle 10. In similar fashion, other rail wheel support members are preferably affixed to a portion of longitudinal frame 70 of vehicle 10.

As seen in the drawings, the support member 300A has a hollow interior chamber 350A on its lower portion, such hollow interior chamber extending upwardly from opening 360A on the lower end of the support members. The hollow longitudinal chamber does not extend all the way up the support member 300A, but in some embodiments may do so. Reciprocally mounted in a longitudinal manner, so as to reciprocate substantially vertically along the long axis of said chamber 350A is a reciprocating hydraulically lift member 380A which is adapted to reciprocally move up and down chamber 350a in a vertical direction through hydraulically actuated or other means. In the embodiment shown in the drawings, the hydraulic apparatus is affixed on its lower end to the upper portion 440A of rail wheel support member 460A so that when the hydraulic lift member 380A moves up and down in chamber 350A, the rail wheel support member 460A moves accordingly up and down. Integrally affixed adjacent the lower end 420A of the rail wheel support member is a stub axle 180a on which is mounted for free rotation a flanged railroad wheel 200A which is adapted when lowered into position to roll along on a railroad track, 210A as shown.

As can be seen from the drawings, the lower end of the rail wheel support member 460A is formed with a bore 485A near its lower extremity. This bore 485A has a bearing surface and is adapted to receive the circular stub axle 180A which latter axle is fitted and configured so as to freely rotate within the bore 485A. One end of said axle 180A is enlarged relative to the size of the bore 485A so as to form a stop so that the distal ends of the stub axle 180A will not move through such bore. As stated, fixedly mounted in a concentric manner to the stub axle 180A is the rail wheel 200A of conventional structure having a flanged circumferencial structured to keep the rail wheel on the rail. This structural aspect of the rail wheel 200A is conventional, and no invention is claimed in the structure of the rail wheel 200A itself or the aspect of the use of rail wheels on a non-rail vehicle as auxiliary wheel members, as stated above.

Figure 3:
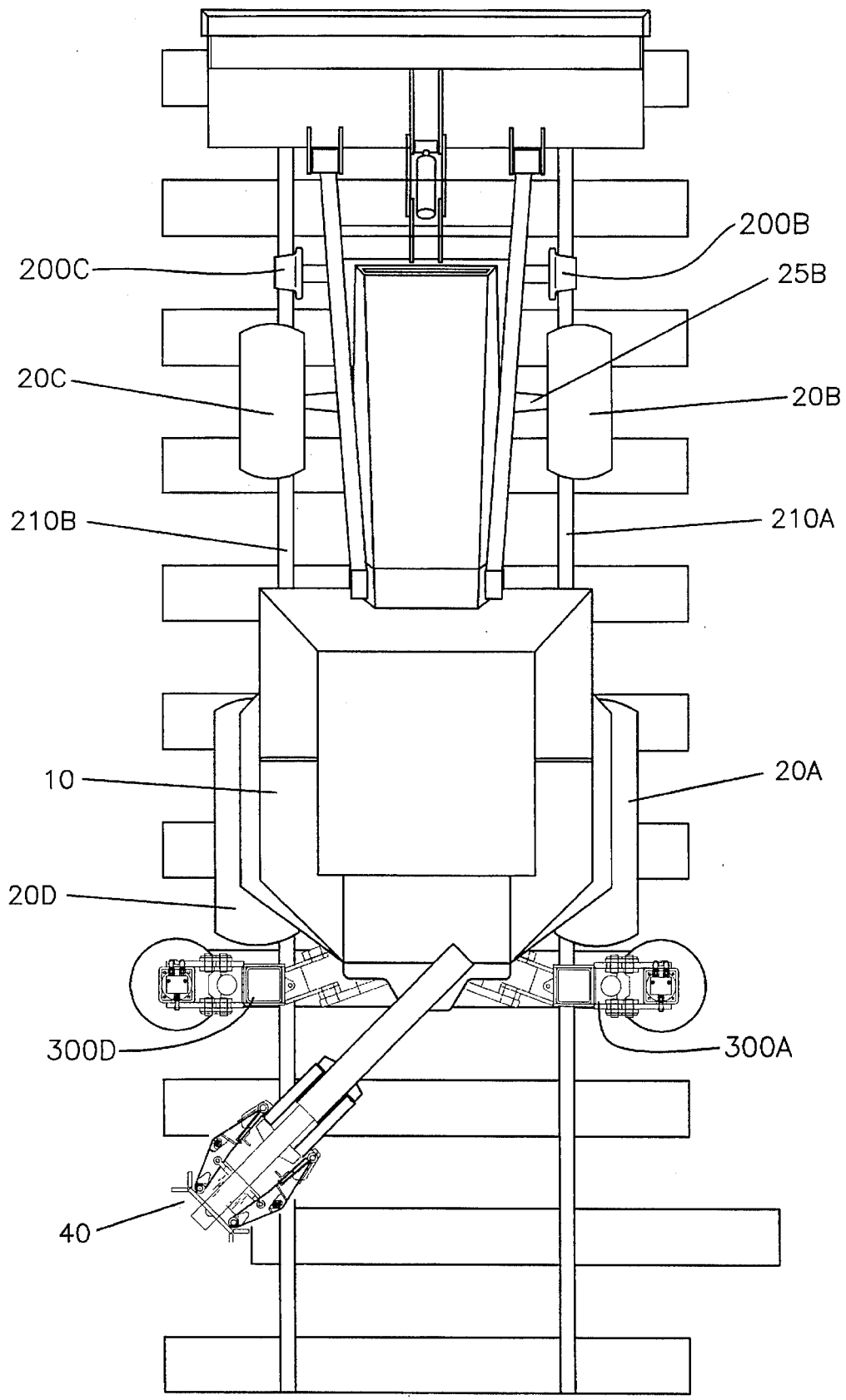
FIG. 3 is a top elevational view of the vehicle shown in FIG. 1, showing a top elevational view of the subject apparatus.
Figure 4:
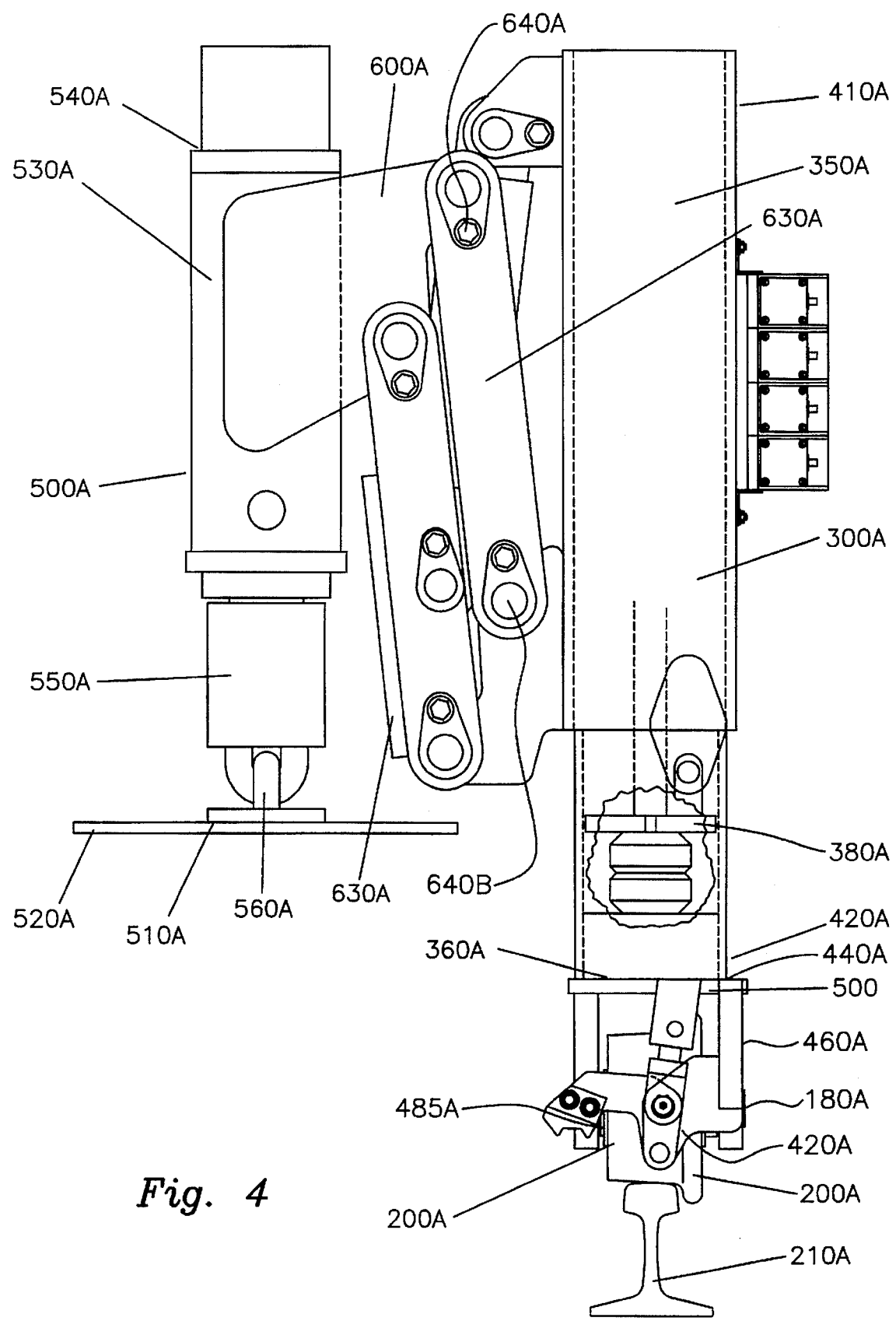
FIG. 4 is a front elevational view of the subject invention, shown with a parallel linkage style outrigger.
Figure 5:
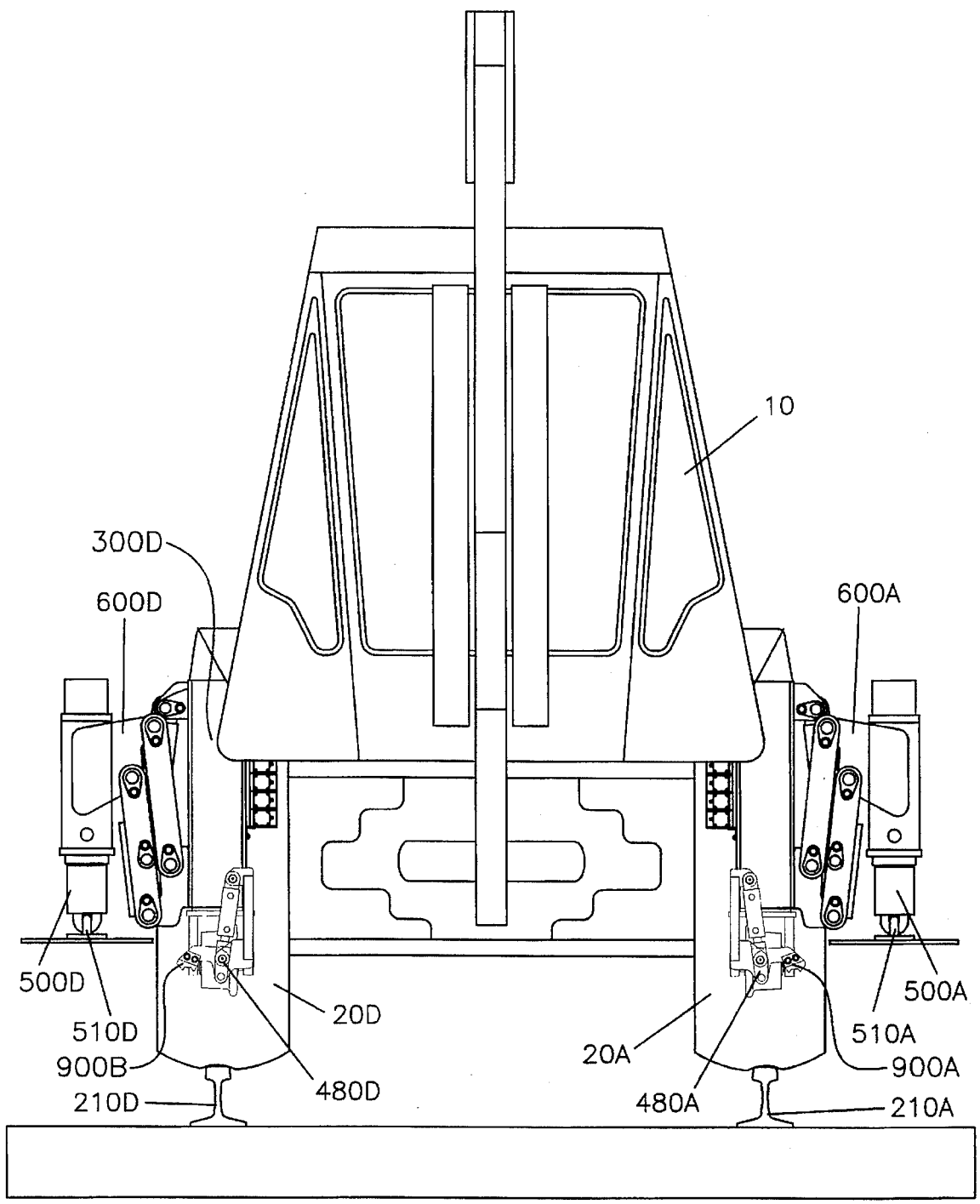
FIG. 5 is an rear elevational view of the vehicle shown in FIG. 1, showing a rear elevational view of the subject invention.

As shown in the drawings, affixed to the vertically disposed exterior of the vertical support member 300A is a retractable ground support member 500A. The ground support member functions when the vehicle is deployed in the work mode, as seen in FIG. 3, to extend downwardly to the work position shown in FIG. 6, from the retracted position shown in FIG. 3, to be where the base support plate 510A is rested on its lower surface 520A flush against the ground.

The ground support member 500A is seen as comprising a vertical stanchion arm 530A that has an upper end 540A and a lower end 550A. The base support plate 510A as seen is mounted on the lower end 550A of stanchion arm through a rotatable member 560A permits the ground support member to swivel within a limited degree to accommodate variations in the terrain.

Affixed to the side exterior portion of the stanchion arm 530A is a brace plate 600A which is rigidly supported on the stanchion arm 530A. Affixed to the portion of the brace plate 600A that is distal from the stanchion arm 530A are parallel retractable arm members 630A and 630B that are in turn mounted to the exterior of the vertical support member 300A by through separate pivotal members 640A and 640D that permit the ground support member to be lowered to a support position or raised to a retracted position in a pivotal manner from the vertical support member 300A, as seen in the drawings.

Figure 6:
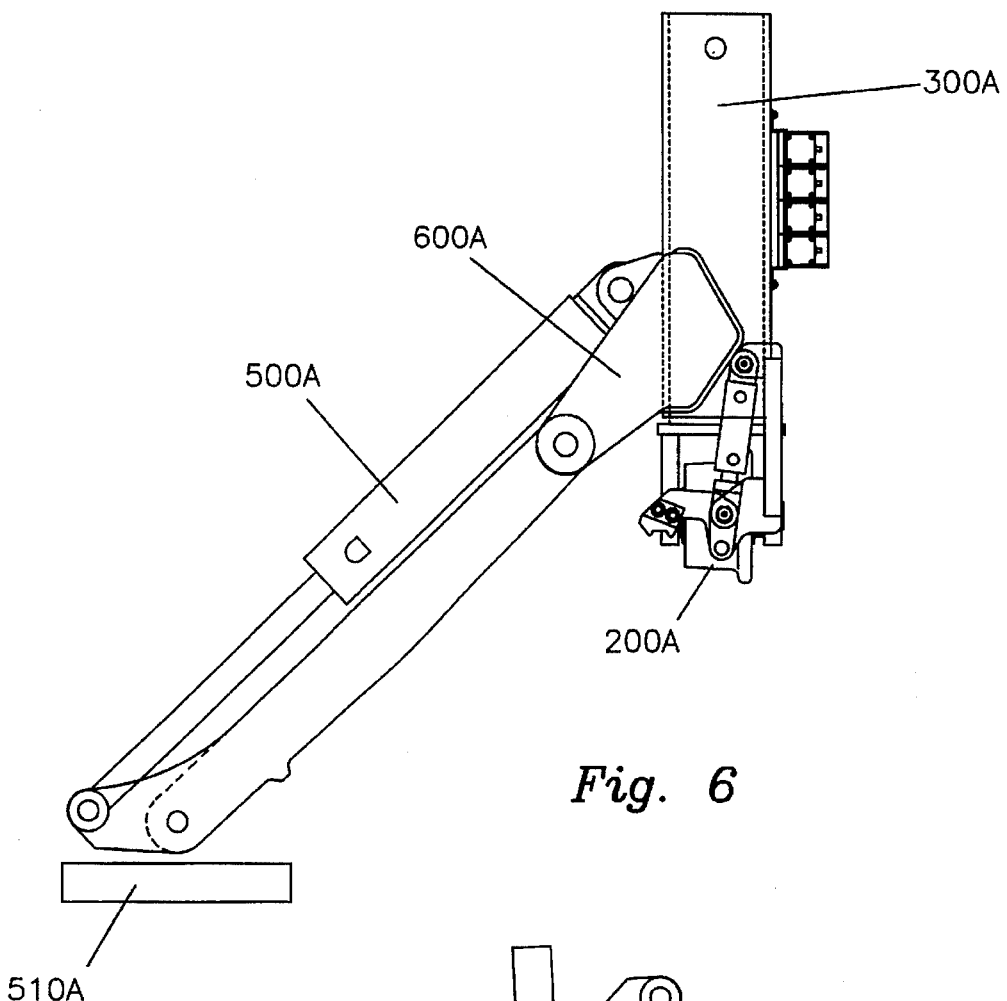
FIG. 6 is a front elevational view of the subject invention shown with pivoting style outrigger in the fully extended position.
Figure 7:
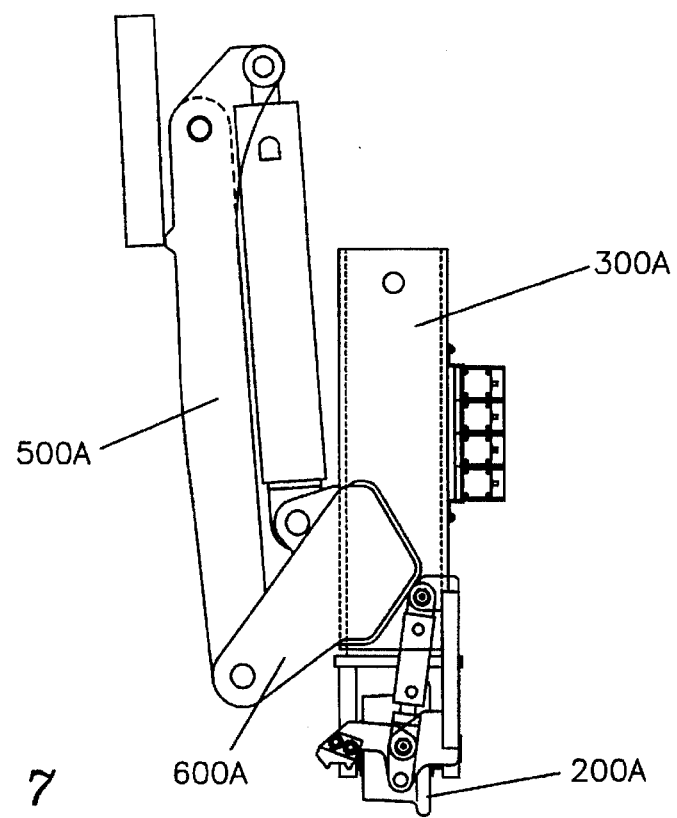
FIG. 7 is a front elevational view of the shown with pivoting style outriggers in the retracted position.
Figure 8:
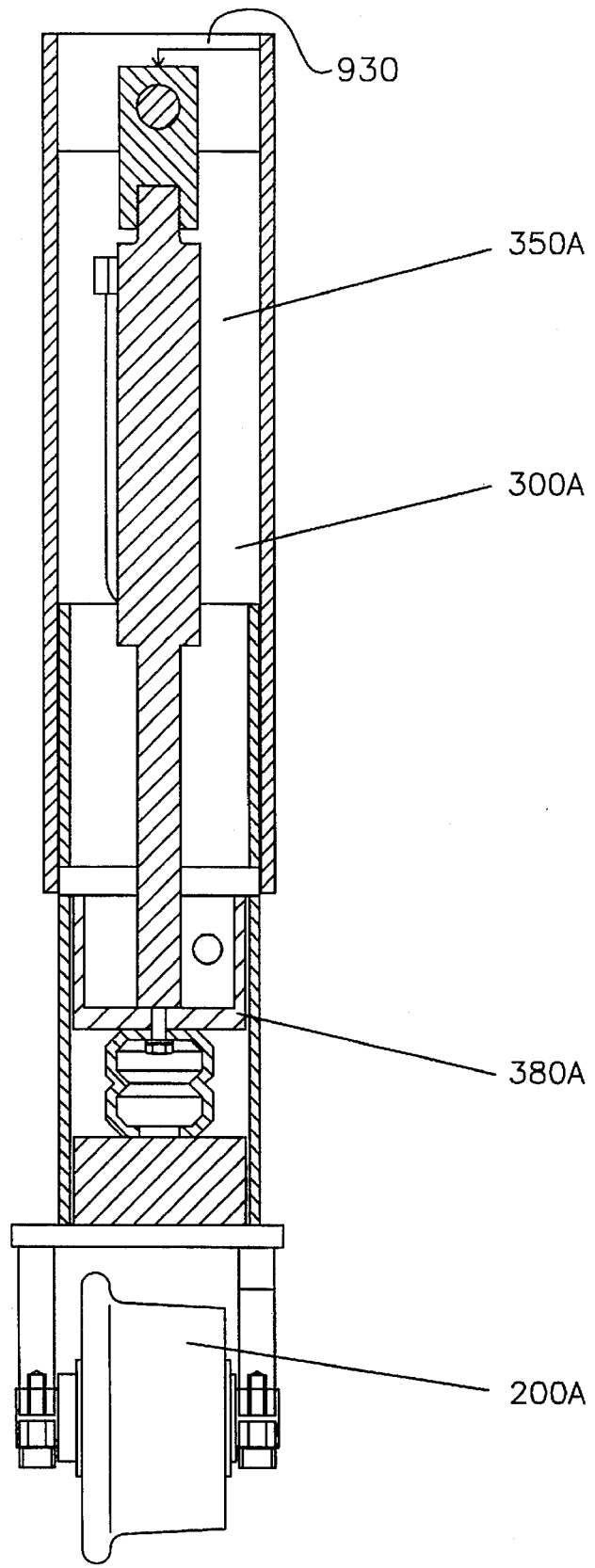
FIG. 8 is a front elevational view, partially in section, of the rail wheel support member showing the integrally affixed railroad wheel.

In summary, the subject invention centers around a vehicle 10 having a vertical support member affixed to a portion of the vehicle frame, which vertical support member is a modular member that includes separate units appended thereto, which separate units may include rail clamping members, retractable rail wheels, and retractable outrigger style ground support members. The ground support members, as seen particularly in FIG. 6 and FIG. 7, are extended outwardly to the full ground support position from the retracted position shown in FIG. 7. The ground support members can be comprised of the parallel linkage assemblies shown in FIG. 6 and FIG. 7, or they can been comprised of other structural arrangements as may be appropriate for the vehicle or system involved. Moreover, the ground support member or members can be structured as pivoting or non-pivoting members affixed to the vertical support member, or can comprise the type that simply move horizontally outwardly and then downwardly. Further, the vertical support member or members may be affixed to any portion of the vehicle.

In one embodiment of the subject invention, rail clamping members 900A and 900B are affixed to the vertically movable rail wheel support and holder member. These rail clamps 900A and 900B are adapted to engage the juxtaposed rail heads of rails 210A and 210B when the rail wheels are lowered into position on the rail. Rail clamps 900A and 900B are adapted to clench opposing sides of the respective rails and 210A and firmly hold same so as to effectively lock the rails and vehicle to falicitate such evolutions as tie removal.

There is affixed within the internal chamber of the vertical support member a biasing member in the form of a spring 930 or other such pressure producing apparatus with the spring 930 being anchored or secured to a portion of the internal walls of the internal chamber with the opposite end of said spring member being affixed to the upper portion of the vertically movable rail wheel holder. The spring 930 functions to bias the rail wheel holder, and thereby the rail wheel and the rail clamping members, or any guide-wheels affixed that are adapted to guide the rail wheel or clamping members into place.

In summary, the subject invention is an apparatus for supporting an auxiliary railway wheel and a stabilizing outrigger on a land-based vehicle having a frame and over-the-road wheels, such apparatus comprising: (a) a vertically disposed stanchion member affixed to a portion of the frame of such vehicle, such vertically disposed stanchion member having an upper end and a lower end; (b) elevating means affixed to such stanchion member and having a lower end and upper end; (c) a rail wheel affixed to the lower end of such elevating means with said rail wheel to be lowered into position for rolling engagement on a railroad track or raised upwardly in a position away from engagement with a railroad track; (d) a retractable stabilizing outrigger affixed to the elevating means on such stanchion so as to be retracted downwardly into a stabilizing position as the rail wheel is also lowered into the rail engagement position.

In further summary, the subject invention is an apparatus for raising and lowering auxiliary railway wheels on a land-based vehicle having a frame and ground wheels for track-ing purposes, such apparatus comprising: (a) a vertically disposed support member affixed to a portion of the frame of such vehicle, said vertically disposed support member having an upper end and a lower end; (b) elevating means having a lower end and an upper end and affixed to a portion of such support member; (c) a rail wheel affixed to the lower end of such elevating means; (d) retractable auxiliary, ground support means affixed to a position of such support member.

In further summary, the subject invention is an apparatus for raising and lowering auxiliary railway wheels on a land-based vehicle having a frame and land wheels, such apparatus comprising: (a) a vertically disposed support member affixed to a portion of the frame of such vehicle, said vertically disposed support member having an upper end and a lower end; (b) elevating means having a lower end and an upper end affixed adjacent the lower end of such support member; (c) a rail wheel assembly affixed to the lower end of such elevating means; (d) retractable land support means affixed to a potion of such support member.

In further summary, the subject invention is an apparatus for supporting rail wheels on a land vehicle having a frame comprising: (a) a vertically extending longitudinal extending support member having a longitudinally extending central axis, such longitudinally extending support member having an upper end and a lower end with such support member having a hollow interior chamber extending from an opening disposed in the lower end up through the support member a given distance, with the upper end affixed to a portion of the frame of such vehicle; (b) a longitudinally extending left member slidably and reciprocally mounted within said chamber in such support member; (c) a retractable rail wheel member affixed to such lift member.

In further summary, the subject invention is an apparatus for supporting rail wheels on an over-the-ground vehicle comprising: (a) a vertically extending support member having a longitudinally extending central axis, such longitudinally extending member having an upper end and a lower end, with such support member having a hollow interior chamber extending from an opening disposed in the lower end up through the support member a given distance, with the upper end of such support member affixed to a portion of the frame of said vehicle; (b) a longitudinally extending lift member slidably and reciprocally mounted within such chamber in such hollow chamber of such support member; (c) a rail wheel rotatably mounted to a portion of such lift member; (d) an extendable ground support member affixed to a portion of such support member.

In further summary, the subject invention is an apparatus for raising and lowering auxiliary railway wheels on a land-based vehicle having a frame and over-the-road wheels, such apparatus comprising: (a) a vertically disposed support member affixed to a portion of the frame of such vehicle, said vertically disposed support member having an upper end and a lower end; (b) elevating means having a lower end of such support member; (c) a rail wheel means affixed to a portion of such elevating means; (d) retractable support means affixed to a portion of such support member.

In further summary, the subject invention is an apparatus for supporting an auxiliary railway wheel and a stabilizing outrigger on a land-based vehicle having a frame and ground wheels, such apparatus comprising: (a) a vertically disposed stanchion member affixed to a portion of the frame of such vehicle, such vertically disposed stanchion member having an upper end and a lower end; (b) elevating means affixed to such stanchion member and having a lower end and an upper end; (c) a rail wheel affixed to the lower end of such elevating means with such rail wheel to be lowered into position for rolling engagement on a railroad track or raised upwardly in a position away from engagement with a railroad track; (d) a retractable stabilizing outrigger affixed to the elevating means on such stanchion so as to be retracted downwardly into a stabilizing position as the railwheel is also lowered into the rail engagement position.

In further summary, the subject invention is an apparatus for supporting rail wheels on a vehicle having a frame comprising: (a) a vertically extending support member having an exterior and a longitudinally extending central axis, such longitudinally extending member having an upper end and a lower end with such support member having a hollow interior chamber extending from an opening disposed in the lower end up through the support member a given distance, with a portion of the such vehicle; (b) a longitudinally extending lift member slidably and reciprocally mounted within such interior chamber in such support member; (c) a rail wheel member rotatably affixed to a portion of such lift member; (d) movable auxiliary ground support means affixed to a portion of the exterior of such support member.

In further summary, the subject invention is an apparatus for raising and lowering auxiliary railway wheels on a land-based vehicle having a frame and ground wheels, such apparatus comprising: (a) a vertically disposed stanchion member affixed to a portion of the frame of such vehicle, such vertically disposed stanchion member having an upper end and a lower end; (b) elevating means having a lower end and an upper end affixed to the lower end of such stanchion member; (c) a rotatable rail wheel affixed to the lower end of such elevating means; (d) retractable auxiliary ground support means affixed to a portion of such stanchion member, such ground support means being adapted to extend into from a given retracted position to an extended use position.

In further summary, the subject invention is an apparatus for raising and lowering auxiliary railway wheels on a vehicle having a frame and wheels for, such apparatus comprising: (a) a support member affixed to a portion of the frame of such motor vehicle, such support member having an upper end and a lower end; (b) elevating means affixed to such support member; (c) a rail wheel rotatably affixed to such elevating means; (d) ground support means affixed to such support member.

I claim:

1. An apparatus for supporting and raising and lowering an auxiliary railway wheel and a stabilizing outrigger on a land-based vehicle having a frame and over-the-road wheels, said apparatus comprising:

(a) a vertically disposed support member affixed to a portion of the frame of said vehicle, said vertically disposed support member having an upper and a lower end;

(b) elevating means affixed to said support member and having a lower end and upper end;

(c) a rail wheel affixed to the lower end of said elevating means, said rail wheel to be lowered into position for rolling engagement on a railroad track or raised upwardly in a position away from engagement with said railroad track;

(d) a retractable stabilizing outrigger affixed to said support member so as to be extended downwardly into a stabiling position to stabilize said land-based vehicle in a fixed position;

(e) rail clamping means affixed to a portion of the end of said elevating means, said clamping means being structured as a pivotable clamping member that is structured to pivot downwardly from the lower end of the elevating means to a position engaging a rail;

(f) biasing means integrally affixed at the upper portion of the support member to bias the elevating means and the rail wheel downwardly.

2. An apparatus for raising and lowering auxiliary railway wheels on a land-based vehicle having a frame and ground wheels, said apparatus comprising:

(a) a vertically disposed support member affixed to a portion of the frame of said vehicle, said vertically disposed support member having an upper end and a lower end, said vertically disposed support member having an internally disposed hydraulic chamber with vertically actuated hydraulic means integrally disposed inside the chamber of said support member;

(b) elevating means having a lower end and an upper end with the upper end of said elevation means integrally connected to said hyraulic means in said chamber of said support member with the lower end of such elevation means projecting outside the lower end of said chamber in said support member;

(c) a rail wheel rotatably affixed to the lower end of said elevating means;

(d) retractable ground support means affixed to a portion of said support member;

(e) rail clamping means pivotally affixed to a portion of the lower end of said elevation means, and structured for pivotable engagement of a railroad track;

(f) biasing means in said chamber in said support member adapted to bias the elevating means and the rail wheels downwardly into position on said railroad track.

3. An apparatus for raising and lowering auxiliary railway wheels for engagement with railway rails, said apparatus being provided on a land-based vehicle used for working modes along a railway, said vehicle having a frame and land wheels, said apparatus comprising:

(a) a vertically disposed support member affixed to a portion of the frame of said vehicle, said vertically disposed support member having an upper end and a lower end;

(b) elevating means having a lower end and an upper end affixed to said support member;

(c) a rail wheel assembly affixed to the lower end of said elevating means;

(d) retractable land support and stabilization means affixed to a portion of said support member, said support and stabilization means being structured as an auxiliary member on said vehicle to stabilize said vehicle when used in working modes along said railway;

(e) rail clasping members pivotably mounted to the lower end of said elevating means, said rail clasping members being adapted to selectively grasp and ungrasp a railroad rail;

(f) bias means affixed to said support member to bias the elevating means downwardly so that said rail wheel engages one of said railroad rails.

4. An apparatus for supporting an auxiliary railway wheel for use on a railroad track and a stabilizing outrigger on a land-based vehicle having a frame and ground wheels, said apparatus comprising:

(a) a vertically disposed stanchion member affixed to a portion of the frame of said vehicle, said vertically disposed stanchion member having an upper end and a lower end;

(b) elevating means integrally affixed to said stanchion member;

(c) a rail wheel affixed to the lower end of said elevating means, said rail wheel to be lowered into position for rolling engagement on said railroad track or raised upwardly in a position away from engagement with said railroad track;

(d) rail clamping means pivotally affixed to a portion of the lower end of said elevation means, and structured for pivotable engagement with said railroad track;

(e) a tractable stabilizing outrigger adapted to stabilize the vehicle, said outrigger affixed to said stanchion so as to be extended downwardly into a stabilizing position on the ground adjacent to said railroad track;

(f) spring bias means in said stanchion member to bias the elevating means downwardly when said rail wheel is positioned on said railroad track.

* * * * *